(12) United States Patent
Bizzarro et al.

(10) Patent No.: US 9,272,293 B2
(45) Date of Patent: Mar. 1, 2016

(54) PARTICLE SEPARATOR

(71) Applicant: Hamilton Sundstrand Corporation, Windsor Locks, CT (US)

(72) Inventors: Peter Bizzarro, Canton, CT (US); Charles J. McColgan, West Granby, CT (US); Thomas E. Vatter, Holyoke, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 277 days.

(21) Appl. No.: 13/872,609

(22) Filed: Apr. 29, 2013

(65) Prior Publication Data

US 2014/0318088 A1    Oct. 30, 2014

(51) Int. Cl.
| | | |
|---|---|---|
| B04C 3/00 | (2006.01) | |
| B04C 5/06 | (2006.01) | |
| B01D 45/08 | (2006.01) | |
| B01D 50/00 | (2006.01) | |

(Continued)

(52) U.S. Cl.
CPC . *B04C 5/06* (2013.01); *B01D 45/08* (2013.01); *B01D 46/0031* (2013.01); *B01D 50/002* (2013.01); *B04C 5/081* (2013.01); *B04C 5/103* (2013.01); *B04C 5/14* (2013.01); *B64D 13/00* (2013.01); *B01D 45/16* (2013.01); *B64D 2013/0651* (2013.01); *B64D 2013/0666* (2013.01); *F01M 13/04* (2013.01); *F24F 2221/46* (2013.01); *Y02T 50/56* (2013.01)

(58) Field of Classification Search
CPC ............ B04C 5/06; B04C 5/14; B04C 5/081; B04C 5/103; B64D 13/00; B64D 2013/0666; B64D 2013/0651; Y02T 50/56; F24F 2221/46; B01D 45/16

USPC ............ 55/423, 466, 440–446, 462–465, 450
See application file for complete search history.

(56) References Cited

U.S. PATENT DOCUMENTS 3,993,463 A * 11/1976 Barr ................................. 55/306
4,035,171 A * 7/1977 Reed et al. ........................ 96/190

(Continued)

FOREIGN PATENT DOCUMENTS

| EP | 1621243 A1 | 2/2006 |
| GB | 2230977 A | 11/1990 |
| WO | WO0209846 A2 | 2/2002 |

OTHER PUBLICATIONS

European Search Report, dated Sep. 25, 2014, for Application No. 14166344.3, 5 pages.

*Primary Examiner* — Dung H Bui
(74) *Attorney, Agent, or Firm* — Kinney & Lange, P.A.

(57) ABSTRACT

A particle separator comprises a vessel, a fluid inlet, a fluid swirl passage, a scupper cavity, a first fluid outlet, and a second fluid outlet. The vessel includes a vessel sidewall extending between a vessel top side and a vessel bottom side. The fluid swirl passage includes a first passage end in communication with a fluid inlet disposed on the vessel top side. A second passage end is in communication with a vessel swirl cavity defined at least in part by an inner surface of the vessel sidewall. The scupper cavity includes a scupper entrance disposed along the inner surface of the vessel sidewall, and is spaced circumferentially apart from the second passage end. The first fluid outlet is in communication with the scupper cavity and disposed on the vessel bottom side. The second fluid outlet is disposed above the first fluid outlet in communication with the vessel swirl cavity.

20 Claims, 4 Drawing Sheets

(51) Int. Cl.

| | | |
|---|---|---|
| *B01D 46/00* | (2006.01) | |
| *B04C 5/081* | (2006.01) | |
| *B04C 5/103* | (2006.01) | |
| *B04C 5/14* | (2006.01) | |
| *B64D 13/00* | (2006.01) | |
| *F01M 13/04* | (2006.01) | |
| *B01D 45/16* | (2006.01) | |
| *B64D 13/06* | (2006.01) | |

(56) References Cited

U.S. PATENT DOCUMENTS

| | | |
|---|---|---|
| 4,292,050 A | 9/1981 | Linhardt et al. |
| 4,304,094 A | 12/1981 | Amelio |
| 4,527,387 A | 7/1985 | Lastrina et al. |
| 4,685,942 A | 8/1987 | Klassen et al. |
| 6,524,373 B2 | 2/2003 | Afeiche et al. |
| 6,562,108 B2 | 5/2003 | Durner et al. |
| 6,688,558 B2 | 2/2004 | Breer et al. |
| 6,752,845 B2 | 6/2004 | Haland |
| 6,852,146 B2 | 2/2005 | Holmes et al. |
| 7,266,958 B2 * | 9/2007 | Milde et al. ............... 62/150 |
| 7,691,185 B2 | 4/2010 | Darke et al. |
| 7,866,600 B2 | 1/2011 | Barnard et al. |
| 8,092,145 B2 | 1/2012 | Martel et al. |
| 8,425,641 B2 | 4/2013 | Chaudhari et al. |
| 2004/0007132 A1 | 1/2004 | Holmes et al. |
| 2005/0194295 A1 | 9/2005 | North |
| 2008/0047425 A1 | 2/2008 | Loda et al. |
| 2011/0047959 A1 | 3/2011 | DiBenedetto |
| 2012/0168361 A1 | 7/2012 | Motakef |

\* cited by examiner

PARTICLE SEPARATOR

BACKGROUND

The subject matter disclosed herein relates to a particle separator and, more particularly, to a particle separator for airflow into a cabin of an aircraft.

In aircraft, airflow from a condenser heat exchanger typically has liquid water particles, or droplets, mixed together with air. It is often desirable for these water droplets or other particles to be collected before the airflow is permitted to proceed toward the occupied cabin. The water droplets can be removed to thereby prevent problems with moisture and humidity in the occupied cabin. Various methods and systems have been proposed to collect and then remove the water droplets. These include forcing the airflow to swirl such that the water droplets travel to an outer wall of the swirler due to centrifugal force. At the outer wall, the water droplets are collected for removal. In current applications, however, air velocities in the inlet ducts of the swirlers are very high. These high velocities lead to large pressure losses.

SUMMARY

A particle separator comprises a vessel, a fluid inlet, a fluid swirl passage, a scupper cavity, a first fluid outlet, and a second fluid outlet. The vessel includes a vessel sidewall extending between a vessel top side and a vessel bottom side. The fluid swirl passage includes a first passage end in communication with a fluid inlet disposed on the vessel top side. A second passage end is in communication with a vessel swirl cavity defined at least in part by an inner surface of the vessel sidewall. The scupper cavity includes a scupper entrance disposed along the inner surface of the vessel sidewall, and is spaced circumferentially apart from the second passage end. The first fluid outlet is in communication with the scupper cavity and disposed on the vessel bottom side. The second fluid outlet is disposed above the first fluid outlet in communication with the vessel swirl cavity.

A particle separator comprises a vessel including a fluid inlet and at least one vertically extending vessel sidewall encompassing a fluid swirl cavity. A fluid swirl passage includes a first passage end in communication with the fluid inlet, and a second passage end in communication with the vessel swirl cavity. A vertically extending scupper wall is spaced radially inward of the vessel sidewall to define an annular scupper cavity along an outer edge of the vessel swirl cavity. A scupper entrance spaced circumferentially apart from the second passage end. A fluid outlet is in communication with the vessel swirl cavity, and a drain is in communication with the scupper cavity.

DETAILED DESCRIPTION

In certain embodiments, high-speed inlet air is ducted to a vertically extending sidewall of a substantially cylindrical vessel. A scupper arrangement on the sides of the vessel can provide for separation of a first fluid or particles such as water droplets entrained in inlet air. The entrained fluid can be collected along the outer wall due to centrifugal force. The outlet is arranged to recover the energy from the swirling air without allowing re-entrainment of the water droplets. This recovery results in low pressure losses. Further, because no swirl vanes are needed, a volume of the device is minimized.

Figure 1:
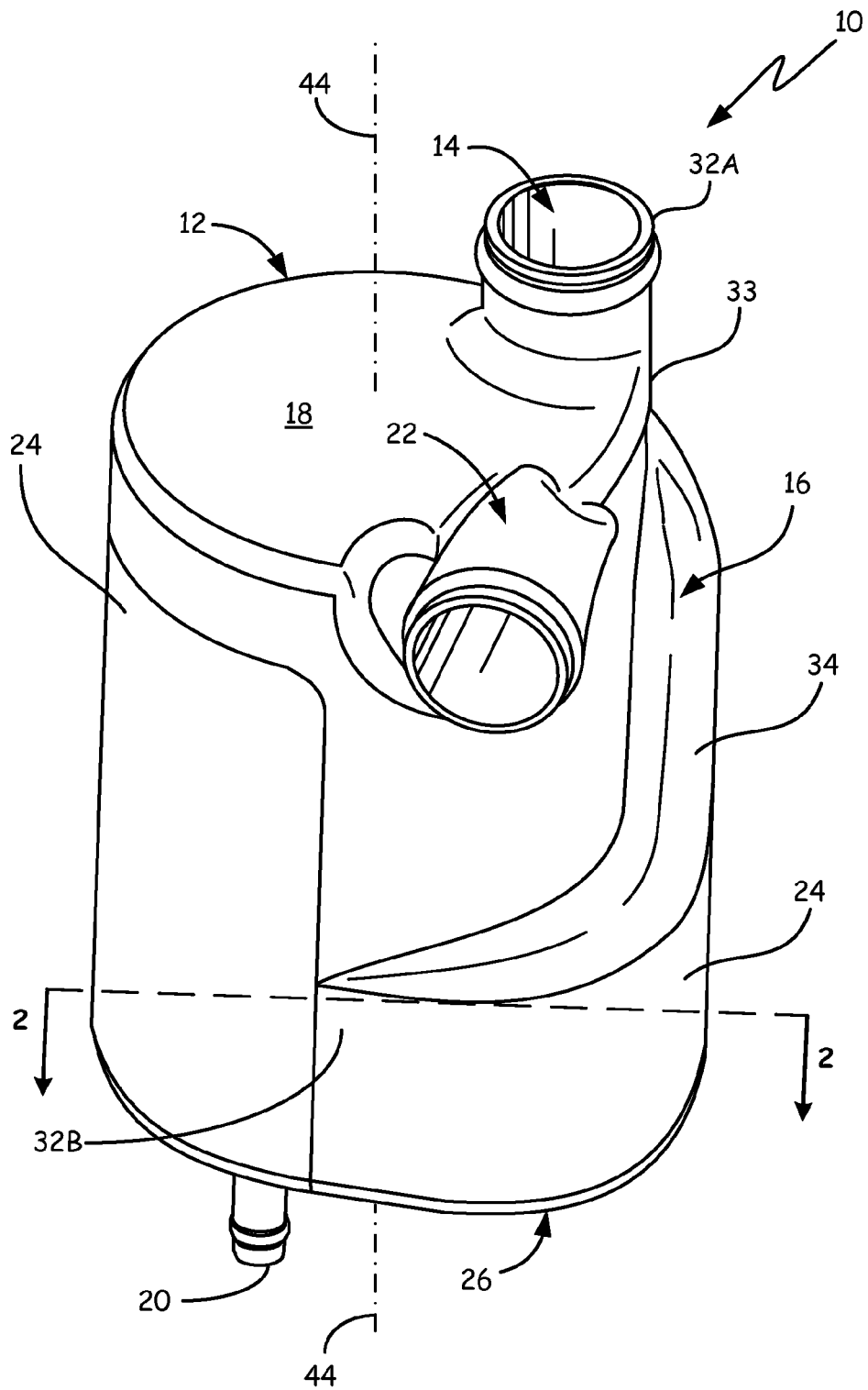
FIG. 1 is a plan view of a particle separator.
Figure 2:
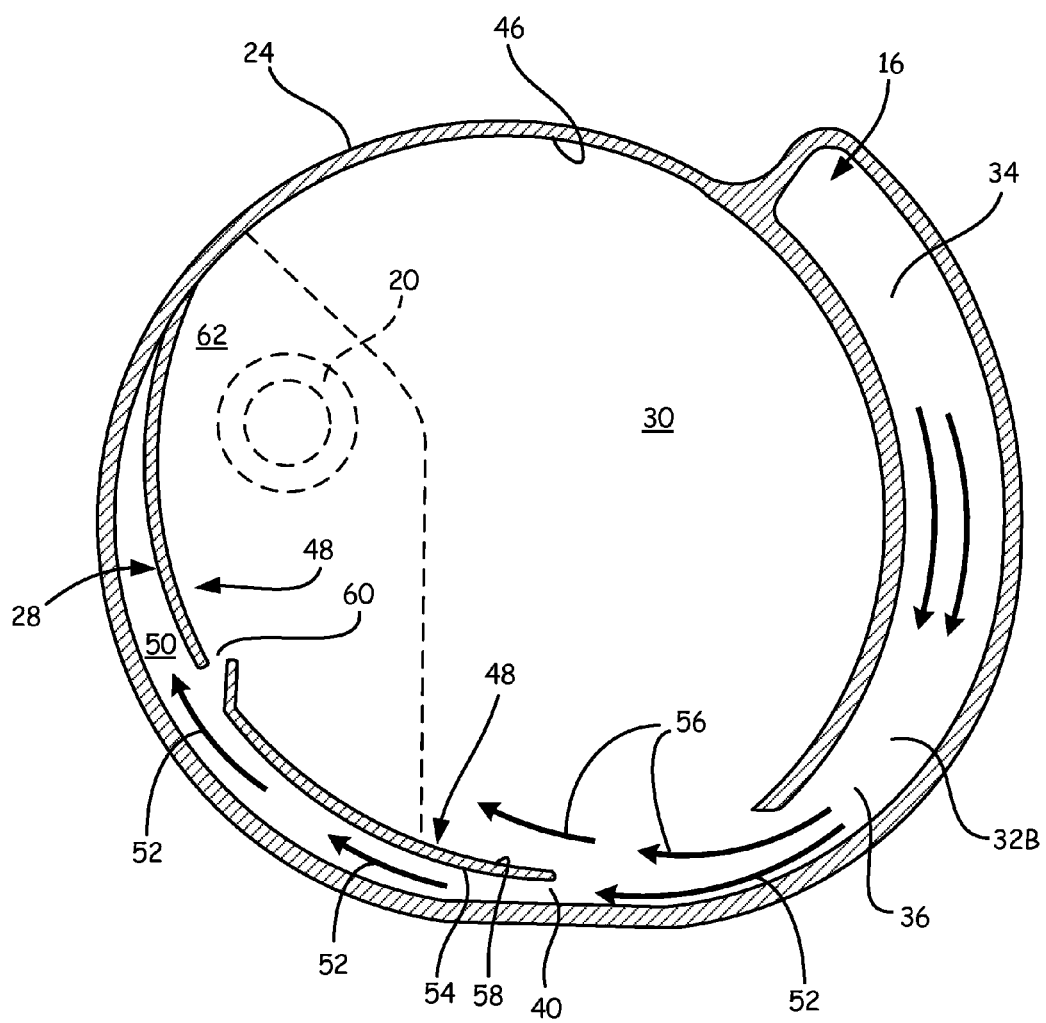
FIG. 2 is sectional view of the particle separator taken across line 2-2 of FIG. 1.

FIGS. 1 and 2 show a vertically configured particle separator 10. FIG. 2 is a sectional view of particle separator 10 taken across line 2-2 of FIG. 1. FIGS. 1 and 2 also include vessel 12, fluid inlet 14, fluid swirl passage 16, vessel top side 18, first fluid outlet 20, second fluid outlet 22, vessel sidewall 24, vessel bottom side 26, scupper 28, vessel swirl cavity 30, swirl passage ends 32A, 32B, swirl passage curved portions 33, 34, swirl cavity opening 36, scupper entrance 40, axial center line 44, vessel sidewall inner surface 46, scupper wall 48, scupper cavity 50, first fluid flowpath 52, scupper wall first surface 54, second fluid flowpath 56, scupper wall second surface 58, scupper vents 60, and outlet chamber 62.

With respect to FIGS. 1 and 2, fluid inlet 14 is disposed on top side 18 of vessel 12, with first fluid outlet 20 and second fluid outlet 22. At least one vessel sidewall 24 extends vertically between top side 18 and bottom side 26. In certain embodiments, vessel 12 is substantially cylindrical and thus can include a single substantially continuous vessel sidewall 24. Scupper 28 is disposed within vessel 12 and can be configured to cooperate with other elements of vessel 12 in order to separate incoming fluids into separate flows directed toward first and second fluid outlets 20, 22.

First fluid outlet 20 can be a drain disposed on bottom side 26 of vessel 12, and is in communication with scupper 28. Second fluid outlet 22 is disposed above first fluid outlet 20 and is in communication with vessel swirl cavity 30, defined at least in part by one or more vessel sidewalls 24. In certain embodiments, second fluid outlet 22 can be formed in vessel sidewall 24 proximate to vessel top side 18 and/or fluid inlet 14. Swirl cavity 30 of vessel 12 is encompassed by the one or more vessel sidewalls 24.

As shown in FIGS. 1 and 2, portions of fluid swirl passage 16 can be disposed inward of vessel top side 18 and/or first vessel sidewall 24. First end 32A of fluid swirl passage 16 is in communication with fluid inlet 14, and second passage end 32B is in communication with vessel swirl cavity 30. As best seen in FIG. 2, one or more swirl cavity openings 36 can be disposed at the far end (e.g., second passage end 32B) of fluid swirl passage 16 proximate second curved portion 34. Opening 36, which provides communication between fluid inlet 14 and scupper 28, can be spaced circumferentially from, and just upstream of, scupper entrance 40. In certain embodiments, swirl cavity opening 36 is located proximate to an intersection of vessel sidewall 24 and vessel bottom side 26.

Fluid swirl passage 16 is shaped to impart outward momentum to the incoming fluid mixture, for example, by causing it to follow the curvature of vessel sidewall 26. For example, fluid swirl passage 16 can include a first curved portion 33 along vessel top side 22, and second curved portion 34 along vessel sidewall 24. Additional outward momentum can be imparted by placing fluid inlet 14 radially inward of vessel sidewall 24, closer to axial center line 44 of vessel 12. The additional outward momentum from fluid swirl passage 16 allows denser fluid particles suspended in the entering fluid mixture to be thrown outward as they flow toward scupper entrance 40 disposed along inner surface 46 of vessel sidewall 24.

Scupper 28 can include scupper wall 48 spaced inwardly from vessel sidewall inner surface 46. Scupper wall 48 can extend substantially along the axial length of vessel 12 and around a circumferential portion of vessel 12. Scupper wall 48 can have a curvature that is similar to a curvature of vessel sidewall 24.

Scupper wall 48, being spaced apart from vessel sidewall inner surface 46 forms annular scupper cavity 50 around a first circumferential portion of vessel 12. In certain embodiments, scupper wall 48 extends circumferentially around a corresponding portion of vessel sidewall 28, but stops short of the circumferential location of second fluid outlet 22. Scupper cavity 50 can also be spaced circumferentially apart from second passage end 32B and opening 36. Thus, the incoming fluid mixture entering by way of inlet 14 can be provided with outward momentum before reaching scupper entrance 40. Between opening 36 and scupper entrance 40, different portions of the incoming fluid proceeds along one of two fluid flow paths through the rest of vessel 12.

First fluid flowpath 52 extends from fluid inlet 14 to first outlet or drain 20. First fluid flowpath 52 also includes fluid swirl passage 16 and scupper cavity 50. A first portion of the received fluid is thus directed to flow toward first fluid outlet 20 through fluid swirl passage 16 and into scupper cavity 50 via entrance 40 disposed along vessel sidewall inner surface 46. The first portion of received fluid then flows through annular scupper cavity 50 between vessel sidewall 28 and first surface 54 of scupper wall 46, before draining downward into first outlet or drain 20.

Second fluid flowpath 56 extends to second fluid outlet 22, and also includes fluid swirl passage 16 and vessel swirl cavity 30. A second portion of the received fluid is displaced by heavier fluid and particles along vessel sidewall 28, and is thus directed inward of scupper entrance 40 to flow along second opposing surface 58 of scupper wall 48. This fluid is mixed with other fluid in vessel swirl cavity 30 before being ejected from second fluid outlet 22.

Scupper wall 48 can also include at least one vent 60 to allow fluid communication between scupper cavity 50 and vessel swirl cavity 30. Due to centrifugal forces, the outward momentum imparted to the incoming fluid mixture is maintained so that the denser fluid (e.g., water) follows first flowpath 52 through scupper cavity 50 to outlet chamber 62. In FIG. 2, outlet chamber 62 surrounds drain 20, both of which are shown in phantom. As will be seen in the exploded view of FIG. 3, a baffle or similar structure can extend between scupper wall 48 and vessel bottom side 26 to separate outlet chamber 62 from vessel swirl cavity 30 while still allowing communication between scupper cavity 50 and drain 20.

Returning to FIG. 2, different portions of the less dense fluid (e.g., air) may generally follow both first flowpath 52 and second flowpath 56. The less dense fluid remaining in first flowpath 52 has less outward momentum and can pass easily through scupper vent(s) 60 to rejoin second flowpath 56 through vessel swirl cavity 30, before being ejected from second fluid outlet 22. Pressure losses can be minimized as the presence of scupper vents 60 permit the less dense fluid but not the denser fluid to flow freely through scupper wall 48 from first flowpath 52 and into second flowpath 56.

Figure 3:
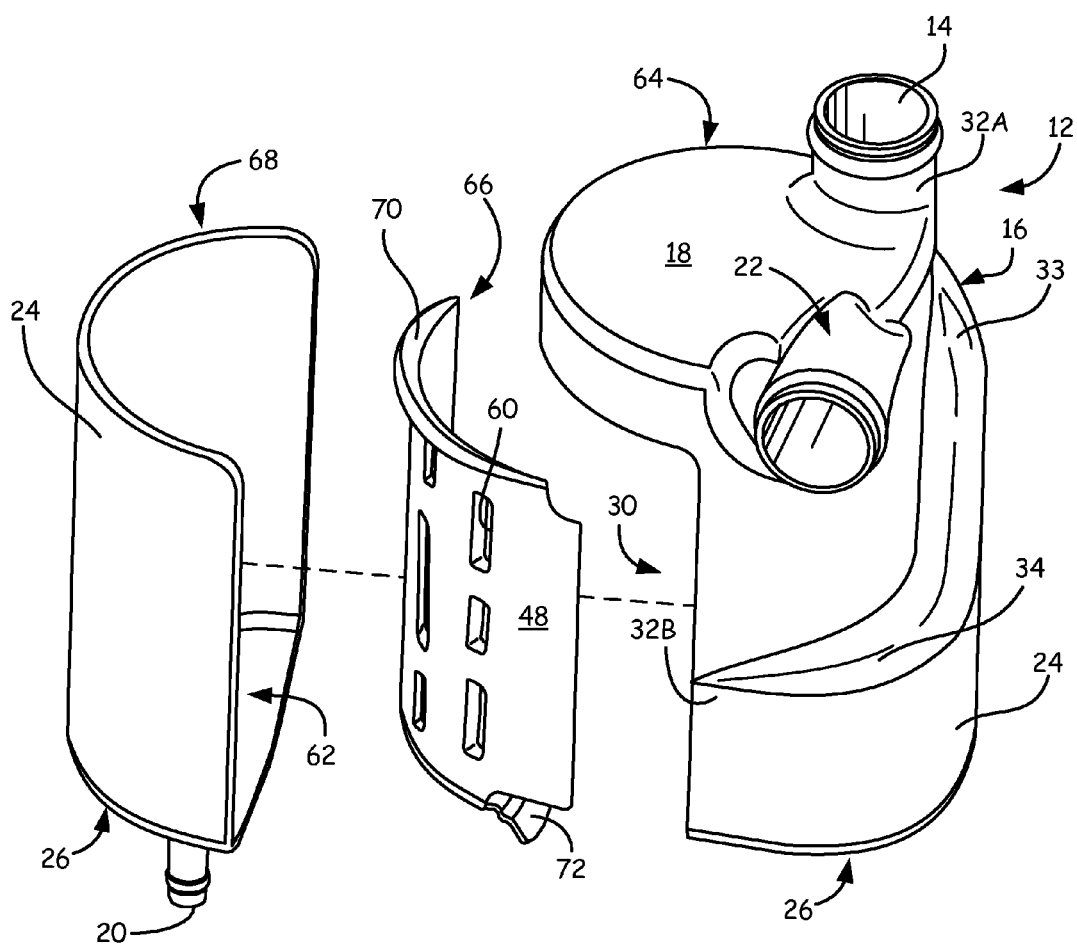
FIG. 3 shows an example modular construction of a particle separator.

FIG. 3 shows an exploded view of one example modular embodiment of vessel 12. In this example, vessel 12 is formed from three separate components: main vessel module 64, scupper wall module 66, and sidewall module 68. Main vessel module 64, which may be cast, forms a majority of vessel 12. Similar to FIGS. 1 and 2, main vessel module 64 includes fluid inlet 14, vessel swirl passage 16, and second fluid outlet 22 proximate vessel top side 18. However, outer wall module 68, which includes a drain serving as first fluid outlet 20, as well as a portion of vessel bottom side 26, is removable from main vessel module 64. This and similar configurations allow access to scupper wall module 66, which can be simply installed within vessel 12 to separate scupper cavity 50 (shown in FIGS. 1 and 2) from swirl cavity 30 (best shown in FIG. 4).

To limit mixing of flows to designated areas, and maintain a compact shape of vessel 12, fluid swirl passage 16 can be separated from second fluid outlet 22 by upper baffle 70. Lower baffle 72 separates fluid swirl passage 16 from scupper cavity 50 and/or outlet chamber 62 (shown in FIGS. 1 and 2). The contiguous scupper wall 48 and lower baffle 72 of scupper wall module 66 can also define a contiguous cavity which includes both scupper cavity 50 (around a circumferential portion of vessel 12), and outlet chamber 62 (around first outlet 20).

Figure 4:
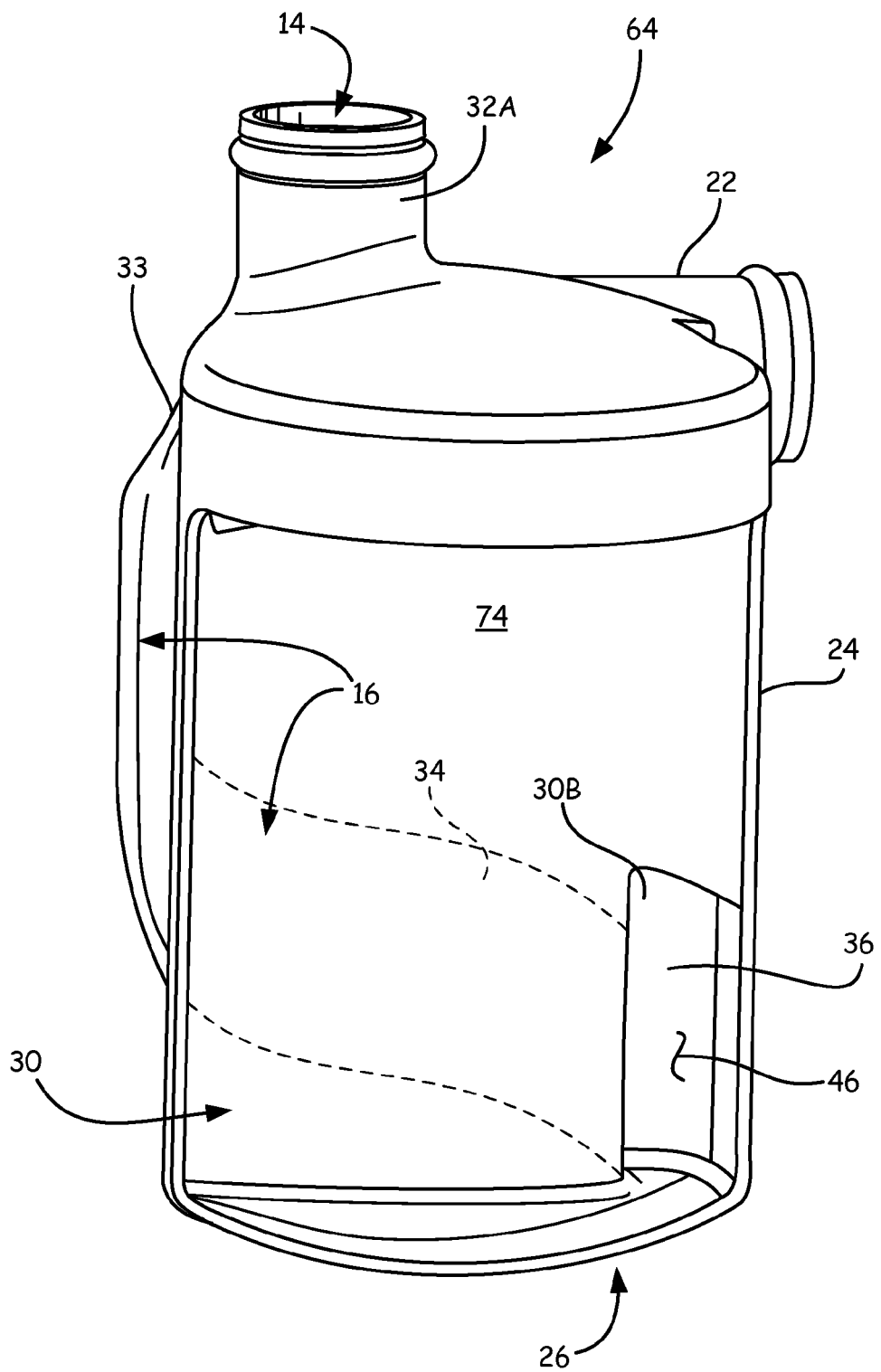
FIG. 4 is a view into a vessel module shown in FIG. 3.

FIG. 4 shows a view into vessel module 64. Fluid swirl passage 16 is open to vessel swirl cavity 30 through opening 36. This can be located proximate an intersection of vessel sidewall 28 and vessel bottom side 30. Vessel sidewall 24 defines a portion of fluid swirl passage 16, with the portion between inlet 14 and opening 36 shown in phantom. In certain embodiments, a portion of fluid swirl passage 16 is bounded by vessel sidewall 24 as well as a separate interior passage wall 74. In these embodiments, one or more openings 36 can be formed through interior passage wall 74 to provide communication between fluid swirl passage 16 and vessel swirl cavity 30.

Discussion of Possible Embodiments

The following are non-exclusive descriptions of possible embodiments of the present invention.

A particle separator comprises a vessel, a fluid inlet, a fluid swirl passage, a scupper cavity, a first fluid outlet, and a second fluid outlet. The vessel includes a vessel sidewall extending between a vessel top side and a vessel bottom side. The fluid swirl passage includes a first passage end in communication with a fluid inlet disposed on the vessel top side. A second passage end is in communication with a vessel swirl cavity defined at least in part by an inner surface of the vessel sidewall. The scupper cavity includes a scupper entrance disposed along the inner surface of the vessel sidewall, and is spaced circumferentially apart from the second passage end. The first fluid outlet is in communication with the scupper cavity and disposed on the vessel bottom side. The second fluid outlet is disposed above the first fluid outlet in communication with the vessel swirl cavity.

The particle separator of the preceding paragraph can optionally include, additionally and/or alternatively, any one or more of the following features, configurations and/or additional components:

A further embodiment of the foregoing particle separator, wherein the fluid swirl passage includes a first curved portion along the vessel top side, and a second curved portion along the vessel sidewall.

A further embodiment of any of the foregoing particle separators, wherein the fluid inlet is disposed radially inward of vessel sidewall.

A further embodiment of any of the foregoing particle separators, wherein the second curved portion of the fluid swirl passage is bounded by a first circumferential portion of the vessel sidewall.

A further embodiment of any of the foregoing particle separators, wherein the first fluid outlet comprises a drain formed on the bottom side of the vessel.

A further embodiment of any of the foregoing particle separators, wherein the second fluid outlet is formed in the vessel sidewall proximate to the top side of the vessel.

A further embodiment of any of the foregoing particle separators, wherein the scupper cavity comprises a scupper wall spaced radially inward from a second circumferential portion of the vessel sidewall, the scupper wall spaced circumferentially apart from the fluid swirl passage.

A further embodiment of any of the foregoing particle separators, wherein the vessel sidewall and the spaced apart scupper wall define an annular scupper cavity.

A further embodiment of any of the foregoing particle separators, further comprising a lower baffle extending between the scupper wall and the bottom side of the vessel.

A further embodiment of any of the foregoing particle separators, wherein the bottom side of vessel and the lower baffle define an outlet chamber in communication with the annular scupper cavity.

A further embodiment of any of the foregoing particle separators, further comprising an upper baffle separating the annular scupper cavity from the second fluid outlet and the vessel swirl cavity.

A further embodiment of any of the foregoing particle separators, further comprising a first fluid flowpath along which a first portion of fluid received in the fluid inlet is directed to flow through the scupper cavity along a first surface of the scupper wall toward the first fluid outlet.

A further embodiment of any of the foregoing particle separators, further comprising a second fluid flowpath along which a second portion of the received fluid is directed to flow into the vessel swirl cavity along a second surface of the scupper wall.

A further embodiment of any of the foregoing particle separators, wherein the scupper wall includes at least one vent allowing communication between the first and second fluid flowpaths.

A particle separator comprises a vessel including a fluid inlet and at least one vertically extending vessel sidewall encompassing a fluid swirl cavity. A fluid swirl passage includes a first passage end in communication with the fluid inlet, and a second passage end in communication with the vessel swirl cavity. A vertically extending scupper wall is spaced radially inward of the vessel sidewall to define an annular scupper cavity along an outer edge of the vessel swirl cavity. A scupper entrance spaced circumferentially apart from the second passage end. A fluid outlet is in communication with the vessel swirl cavity, and a drain is in communication with the scupper cavity.

The particle separator of the preceding paragraph can optionally include, additionally and/or alternatively, any one or more of the following features, configurations and/or additional components:

A further embodiment of the foregoing particle separator, wherein the fluid outlet is formed in an upper portion of the at least one vessel sidewall.

A further embodiment of any of the foregoing particle separators, wherein the fluid swirl passage including a first curved portion proximate the fluid inlet, and a second curved portion along the at least one vessel sidewall.

A further embodiment of any of the foregoing particle separators, wherein the fluid inlet is disposed radially inward of the at least one vessel sidewall.

A further embodiment of any of the foregoing particle separators, further comprising a lower baffle extending between the scupper wall and the bottom side of the vessel, the lower baffle defining an outlet chamber spaced apart from the fluid swirl passage and the vessel swirl cavity; and an upper baffle separating the scupper cavity from the vessel swirl cavity.

A further embodiment of any of the foregoing particle separators, wherein the scupper wall includes at least one vent allowing communication between the scupper cavity from the vessel swirl cavity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A particle separator comprising:
    a substantially cylindrical vessel including a vessel sidewall extending between a vessel top side and a vessel bottom side, the top side and the bottom side defined relative to the vessel sidewall in a vertical orientation;
    a fluid inlet disposed on the vessel top side;
    an fluid swirl passage including a first passage end in communication with the fluid inlet, and a second passage end in communication with a vessel swirl cavity defined at least in part by an inner surface of the vessel sidewall;
    a scupper cavity including a scupper entrance disposed along the inner surface of the vessel sidewall and spaced circumferentially apart from the second passage end;
    a first fluid outlet in communication with the scupper cavity and disposed on the vessel bottom side; and
    a second fluid outlet in communication with the vessel swirl cavity, the second fluid outlet disposed on the vessel sidewall above the first fluid outlet.

2. The particle separator of claim 1, wherein the fluid swirl passage includes a first curved portion along the vessel top side, and a second curved portion along the vessel sidewall.

3. The particle separator of claim 2, wherein the fluid inlet is disposed radially inward of vessel sidewall.

4. The particle separator of claim 2, wherein the second curved portion of the fluid swirl passage is bounded by a first circumferential portion of the vessel sidewall.

5. The particle separator of claim 1, wherein the first fluid outlet comprises a drain formed on the bottom side of the vessel.

6. The particle separator of claim 1, wherein the second fluid outlet is formed in the vessel sidewall proximate to the top side of the vessel.

7. The particle separator of claim 1, wherein the scupper cavity comprises:
    a scupper wall spaced radially inward from a second circumferential portion of the vessel sidewall, the scupper wall spaced circumferentially apart from the fluid swirl passage.

8. The particle separator of claim 7, wherein the vessel sidewall and the spaced apart scupper wall define an annular scupper cavity.

9. The particle separator of claim 8, further comprising:
    a lower baffle extending between the scupper wall and the bottom side of the vessel.

10. The particle separator of claim 9, wherein the bottom side of vessel and the lower baffle define an outlet chamber in communication with the annular scupper cavity.

11. The particle separator of claim 8, further comprising an upper baffle separating the annular scupper cavity from the second fluid outlet and the vessel swirl cavity.

12. The particle separator of claim 8, further comprising:
a first fluid flowpath along which a first portion of fluid received in the fluid inlet is directed to flow through the scupper cavity along a first surface of the scupper wall toward the first fluid outlet.

13. The particle separator of claim 12, further comprising:
a second fluid flowpath along which a second portion of the received fluid is directed to flow into the vessel swirl cavity along a second surface of the scupper wall.

14. The particle separator of claim 13, wherein the scupper wall includes at least one vent allowing communication between the first and second fluid flowpaths.

15. A particle separator, comprising:
- a substantially cylindrical vessel including at least one vessel sidewall extending vertically between a vessel top and a vessel bottom, encompassing a fluid swirl cavity;
- a fluid inlet disposed on the vessel top;
- a fluid swirl passage including a first passage end in communication with the fluid inlet, and a second passage end in communication with the vessel swirl cavity;
- a vertically extending scupper wall spaced radially inward of the vessel sidewall to define an annular scupper cavity along an outer edge of the vessel swirl cavity;
- a scupper entrance spaced circumferentially apart from the second passage end of the fluid swirl passage;
- a fluid outlet in communication with the vessel swirl cavity and disposed in a vessel sidewall; and
- a drain in communication with the scupper cavity and disposed in the vessel bottom below the fluid outlet.

16. The particle separator of claim 15, wherein the fluid outlet is formed in an upper portion of the at least one vessel sidewall proximate to the vessel top.

17. The particle separator of claim 15, wherein the fluid swirl passage including a first curved portion proximate the fluid inlet, and a second curved portion along the at least one vessel sidewall.

18. The particle separator of claim 17, wherein the fluid inlet is disposed radially inward of the at least one vessel sidewall.

19. The particle separator of claim 18, further comprising:
- a lower baffle extending between the scupper wall and the bottom side of the vessel, the lower baffle defining an outlet chamber spaced apart from the fluid swirl passage and the vessel swirl cavity; and
- an upper baffle separating the scupper cavity from the vessel swirl cavity.

20. The particle separator of claim 17, wherein the scupper wall includes at least one vent allowing communication between the scupper cavity from the vessel swirl cavity.

* * * * *